(12) United States Patent
Yeh

(10) Patent No.: US 7,905,509 B2
(45) Date of Patent: Mar. 15, 2011

(54) BRAKE MECHANISM FOR A BABY STROLLER

(75) Inventor: Chuan-Ming Yeh, Chuayi (TW)

(73) Assignee: Link Treasure Limited, Tai Pao, Chia-Yi Hsien (TW)

( * ) Notice: Subject to any disclaimer, the term of this patent is extended or adjusted under 35 U.S.C. 154(b) by 399 days.

(21) Appl. No.: 11/583,175

(22) Filed: Oct. 19, 2006

(65) Prior Publication Data

US 2007/0085304 A1 Apr. 19, 2007

(30) Foreign Application Priority Data

Oct. 19, 2005 (TW) ................................ 94218075 U

(51) Int. Cl.
*B62B 7/00* (2006.01)
*B62B 9/08* (2006.01)
(52) U.S. Cl. ..................... 280/642; 280/47.36; 280/47.38
(58) Field of Classification Search .................. 280/642, 280/643, 647, 648, 650, 657, 658, 47.38, 280/47.39, 47.4, 47.36
See application file for complete search history.

(56) References Cited

U.S. PATENT DOCUMENTS

| | | | | | |
|---|---|---|---|---|---|
| 4,322,093 | A | * | 3/1982 | Otto | 280/650 |
| 5,269,544 | A | * | 12/1993 | Park | 280/5.24 |
| 5,370,408 | A | * | 12/1994 | Eagan | 280/33.994 |
| 5,713,585 | A | * | 2/1998 | Curtis et al. | 280/47.38 |
| 5,927,441 | A | * | 7/1999 | Luo | 188/19 |
| 6,298,949 | B1 | * | 10/2001 | Yang et al. | 188/20 |
| 6,508,605 | B1 | | 1/2003 | Cheng | |
| 6,561,537 | B1 | * | 5/2003 | Chen | 280/648 |
| 6,659,478 | B2 | * | 12/2003 | Hallgrimsson et al. | 280/47.36 |

FOREIGN PATENT DOCUMENTS

| | | |
|---|---|---|
| AU | 2005100830 A4 | 11/2005 |
| JP | 8067255 A | 3/1996 |

* cited by examiner

*Primary Examiner* — J. Allen Shriver, II
*Assistant Examiner* — Bridget Avery
(74) *Attorney, Agent, or Firm* — Muncy, Geissler, Olds, & Lowe, PLLC

(57) ABSTRACT

A brake mechanism for a baby stroller, having a plurality of wheels and a pair of rotatable push arms capable of being moved either forward or rearward. The brake mechanism comprises a connecting assembly and an actuator; and has a braking block for operatively stopping the baby stroller. The connecting assembly has a pulling slider for operatively associating with the braking block of the brake mechanism, and the actuator is operatively secured to the push arm and associated with the connecting assembly, so as to indirectly drive the brake mechanism. This allows a user to manipulate the actuator to stop the stroller from either in front of or behind the stroller.

9 Claims, 8 Drawing Sheets

BRAKE MECHANISM FOR A BABY STROLLER

BACKGROUND OF THE INVENTION

1. Field of the Invention

This invention relates to a brake mechanism and, more particularly, to a brake mechanism which is control by an actuator mounted on the handle portion of a stroller.

2. Description of the Prior Art

A regular stroller frame generally has a pair of push arms for a user to push the stroller forward. Normally, the push arms are fixed behind the stroller, thereby forcing the user to push the stroller only from the rear side. Brake devices are therefore normally equipped on the rear wheel sets and are operable by the user's feet, so as to stop the stroller safely and conveniently.

In order to fulfill the user's need in such a situation, some new stroller designs are furnished with a pair of rotatable push arms. This allows the user to push from the front of the stroller so that they can see and talk with the baby while walking and pushing the stroller. When the user is pushing the stroller from the front, however, the brake device cannot be directly reached by the user's feet, and they therefore cannot stop the stroller immediately. Instead, the user must walk around the stroller to the rear side to utilize the brake.

To avoid such an inconvenience, the stroller may have a pair of brake mechanisms added at the front wheel sets. However, this increases the cost and therefore the selling price of the product. Furthermore, the user may also get confused about which side and which wheel have been braked.

SUMMARY OF THE INVENTION

In order to resolve the above-mentioned problems, the present invention provides a brake mechanism for a stroller that allows the user to stop the stroller either in front of or behind the stroller, by simply manipulated by an actuator to effect the brake mechanism on the wheel sets.

According to one aspect of the present invention a brake mechanism is provided on a stroller frame, which comprises the following features.

An actuator has a base, a control member, an upper flexible connector and a release element. The base is secured to the push arm of the stroller, and the control member is pivoted to the base for operatively rotating about a pivot pin. The release element is moveably secured to the base for positioning the control member in a locked position and releasing position. The upper flexible connector has one end connected to the control member which may be pulled by the control member;

A connecting assembly has a driving slider, a pulling slider and a lower flexible connector. The driving slider is slidably mounted on the push arm, and connected with the upper flexible connector. When the upper flexible connector is pulled by the control member of the actuator, the driving slider will be pulled so as to slide along the push arm and move upwardly. The pulling slider is slidably mounted on the leg frame of the stroller and may slidably abut with the driving slider. The pulling slider has one end connected with the lower flexible connector and may be driven by the driving slider when a user pulls the upper flexible connector via the actuator.

A brake mechanism has a wheel base, a driving element, a resilient element and a braking block. The wheel base is connected with the leg frame and movably receives the braking block and the resilient element, and pivotally connects a wheel hub and the driving element. The wheel hub preferably has a toothed portion which can be engaged with the braking block. The driving element is connected with the lower flexible connector, and is rotatable about a pivot point in the wheel base. The resilient element biases the braking block to leave the toothed portion of the wheel hub until the driving element is pulled by the lower flexible connector, thereby driving the braking block to move against the biasing of the resilient element and engage with the toothed portion to brake the wheel on the wheel hub.

A user can manipulate the actuator either in front of or behind the stroller. That can save the extra cost of adding an additional brake mechanism on the front wheel set and provides the user with an easier way to stop the stroller.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENT

Figure 1:
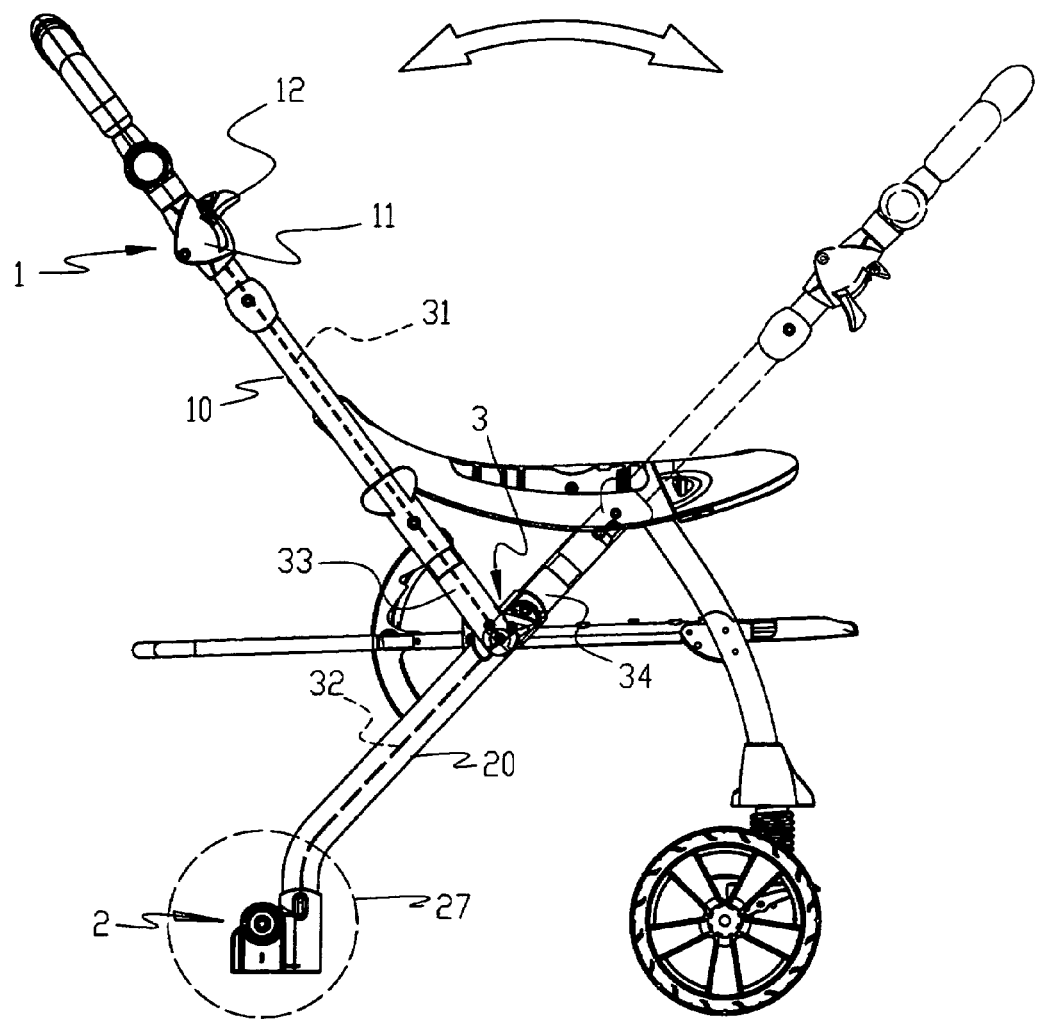
FIG. 1 is a side view of a stroller frame with a brake mechanism according to the present invention, wherein the push arms of the stroller can be rotated to either a forward or backward position.

Referring to FIG. 1, an embodiment of a brake mechanism on a stroller according to the present invention is shown. The stroller frame has a collapsible linkage system which can be fixed in a deployed configuration or folded to a collapsed configuration. The stroller frame includes at least a pair of push arms (33) that are connected by a substantially unshaped handle bar at one end and are rotatable about a pivot point at another end, both push arms being capable of a simultaneous change in direction forward and rearward.

The brake mechanism according to the present invention comprises an actuator (1), a brake mechanism (2), and a connecting assembly (3).

Figure 2:
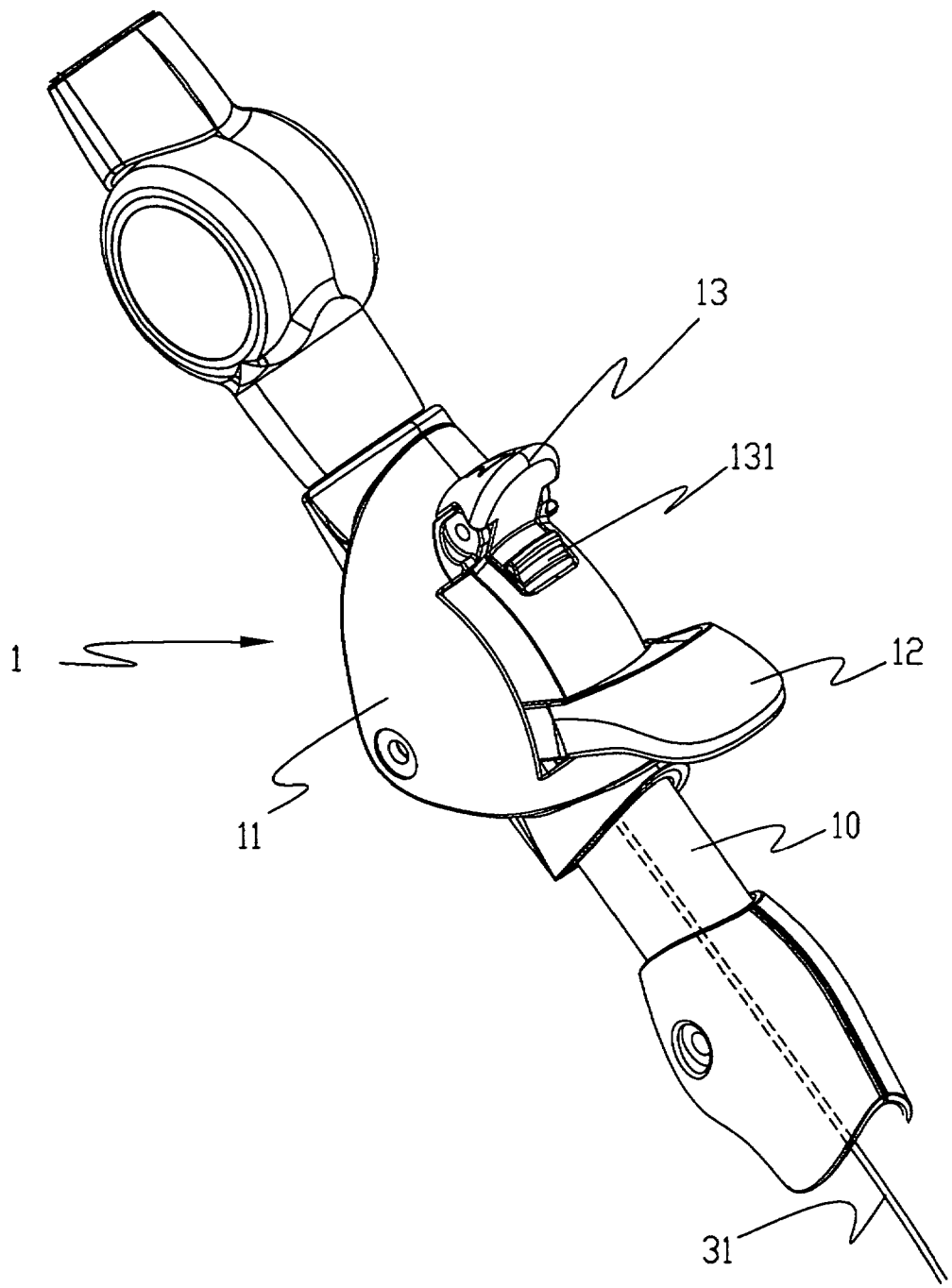
FIG. 2 is a perspective view schematically showing the actuator of the brake mechanism according to the present invention.
Figure 3:
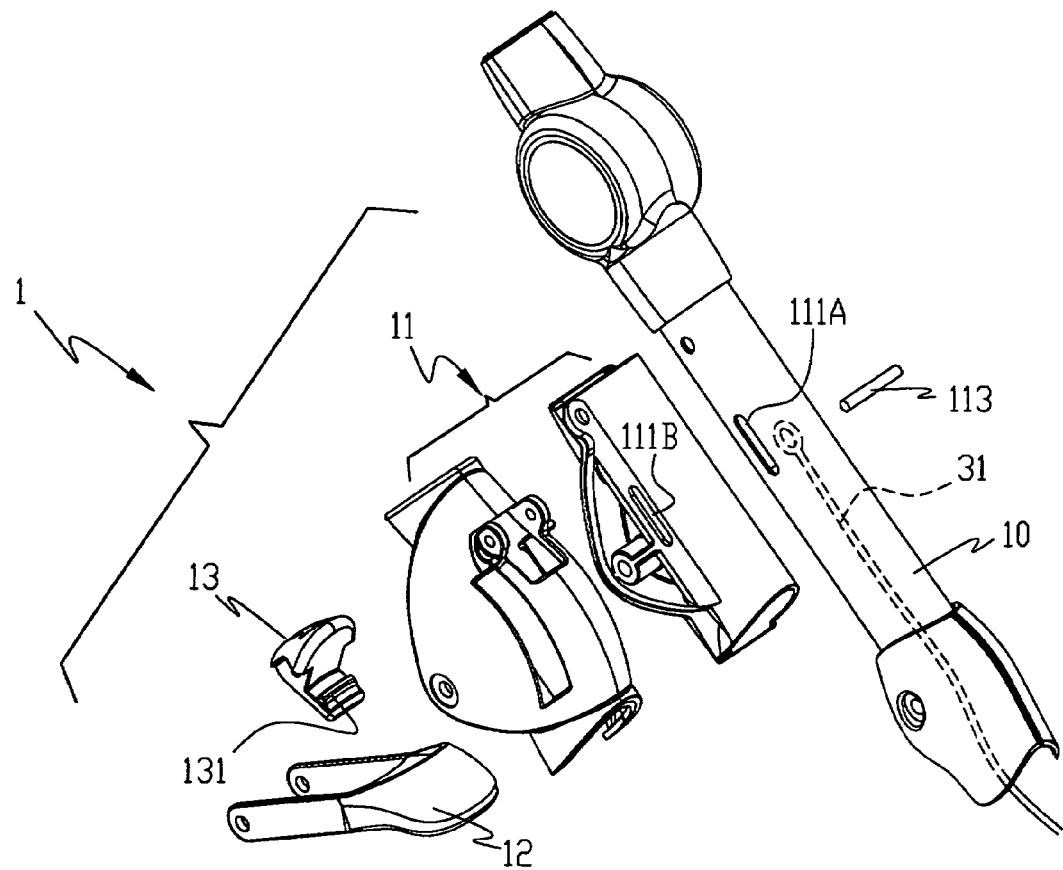
FIG. 3 is an exploded view of the actuator of FIG. 2.
Figure 4:
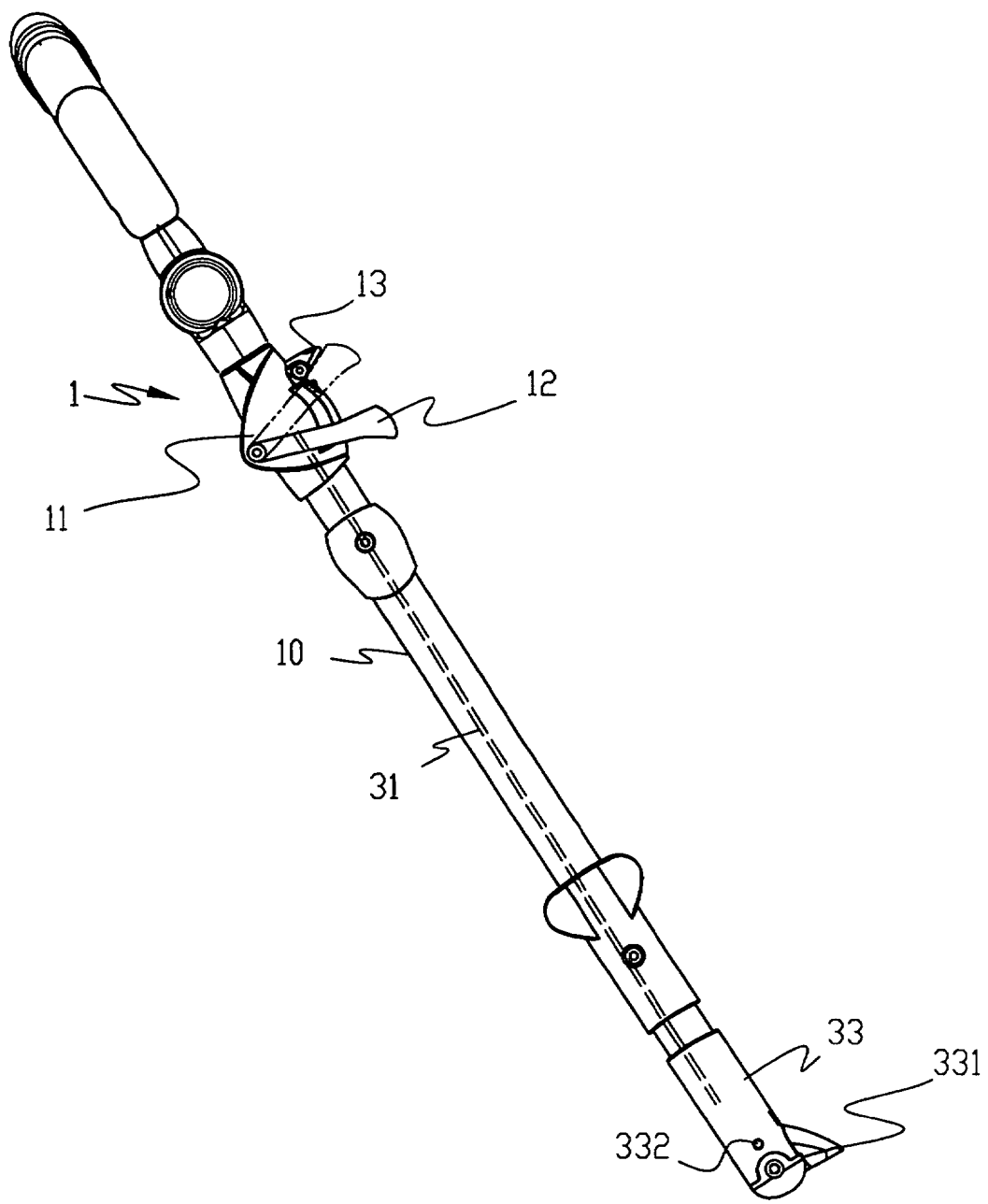
FIG. 4 is a side view showing the operation of the actuator of FIG. 2 which is associated with a driving slider of a connecting assembly via an upper flexible connector.

Referring to FIGS. 2 and 3, the actuator (1) has a base (11), a control member (12), a release element (13) and an upper flexible connector (31). The base (11) is secured to the push arms (10) of the stroller, and the control member (12) is pivoted to the base (11) for operatively rotating about its pivot point in the base (11). The release element (13) is moveably secured to the base (11) and locks the control member (12) in an upward position when the brake mechanism (2) is actuated by the actuator (1). Preferably, the release element (13) comprises a protruding positioning portion (131), which is engageable with the control member (12) and locks the control member (12) in a braking position. More preferably, the control member (12) is connected with the upper flexible connector (31) via a pin (113), for reciprocally associating with the connecting assembly (3) by pulling the upper flexible connector (31) so as to rotate upwardly. In order to allow the pin (113) to move reciprocally, the push arm (10) and the base (11) may provide with a slot (111A and 111B) for guiding the pin (113) to pull the upper flexible connector (31).

Figure 7:
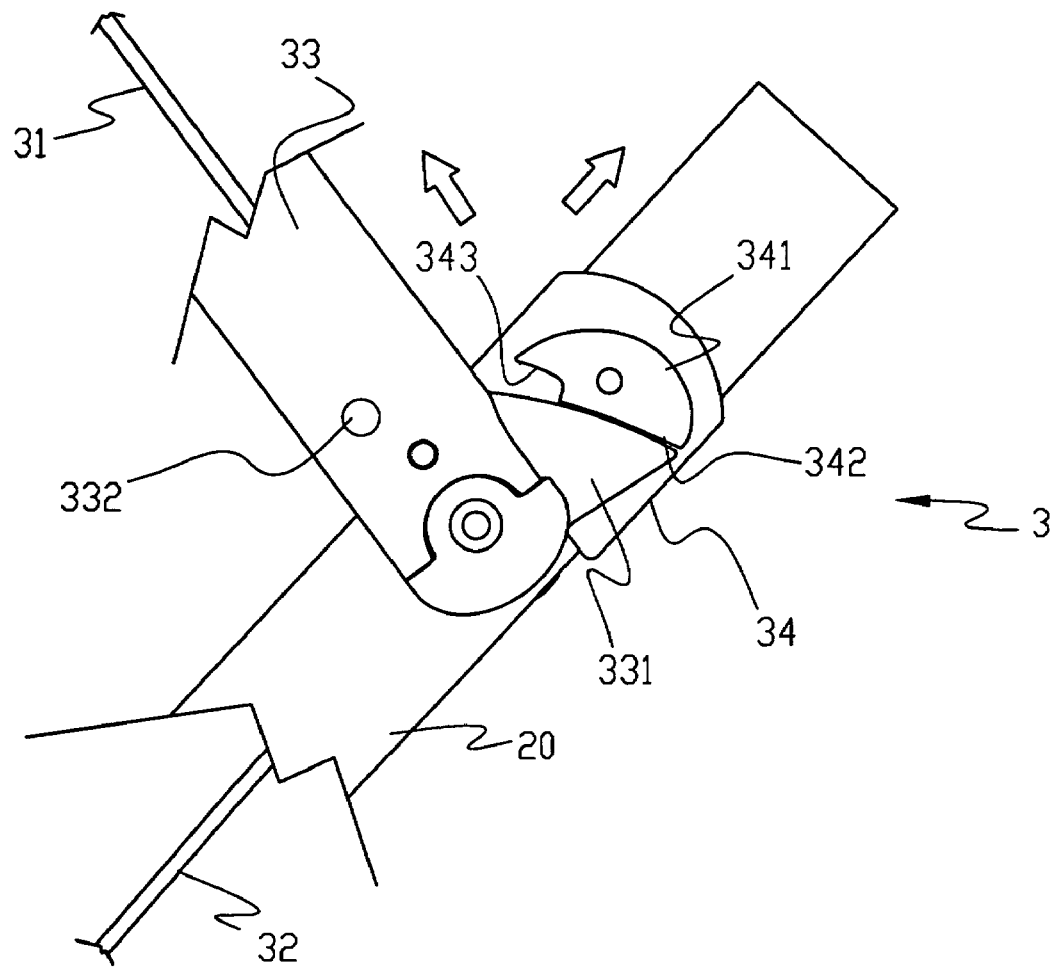
FIG. 7 is a side view schematically showing the operation of the connecting assembly according to the present invention, wherein the push arm is rotated to rear end of a stroller.
Figure 8:
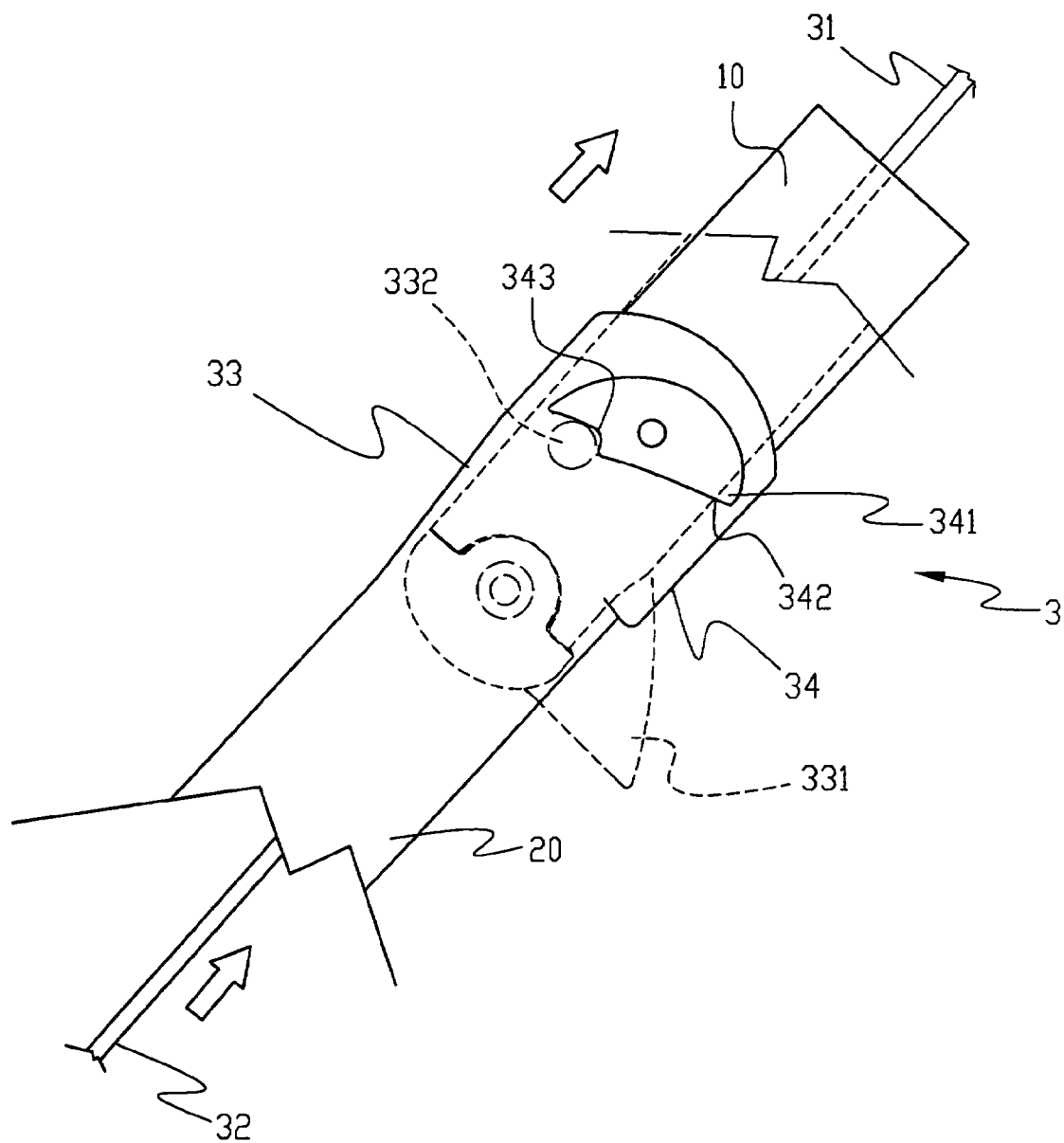
FIG. 8 is a side view schematically showing the operation of the connecting assembly according to the present invention, wherein the push arm is rotated to front end of a stroller.

Referring to FIGS. 2, 7 and 8, the connecting assembly (3) has a driving slider (33), a pulling slider (34) and a lower flexible connector (32). The driving slider (33) is slidably secured to the push arm (10), and has a part being connected with the upper flexible connector (31). When the upper flexible connector (31) is pulled by the control member (12) of the actuator (1), the driving slider (33) is pulled to slide upwardly along the push arm (10). The pulling slider (34) is slidably secured on the leg frame (20) of the stroller and may slidably abutting with the driving slider (33). The pulling slider (34) has a part connected with the lower flexible connector (32) and may be driven by the driving slider (33) when a user pulls the upper flexible connector (31) via the actuator (1).

Preferably, the pulling slider (34) has a upper protruded block (341) providing a first abutting face (342) and a second abutting face (343), and the driving slider (33) has a first protruded block (331) and a second protruded block (332) which respectively protrude from the driving slider (33) to the first abutting face (342) and the second abutting face (343).

When the driving slider (33) is pulled by the actuator (1) via the upper flexible connector (31), the first protruded block (331) moves to abut the first abutting face (342) and force the pulling slider (34) to move, thereby pulling the lower flexible connector (32) upwardly (see FIG. 7). When the push arms (10) are moved to the other end of the stroller, while pulling the driving slider (33), the second protruded block (332) will carry the pulling slider (34) to pull the lower flexible connector (32) upwardly (see FIG. 8).

Figure 5:
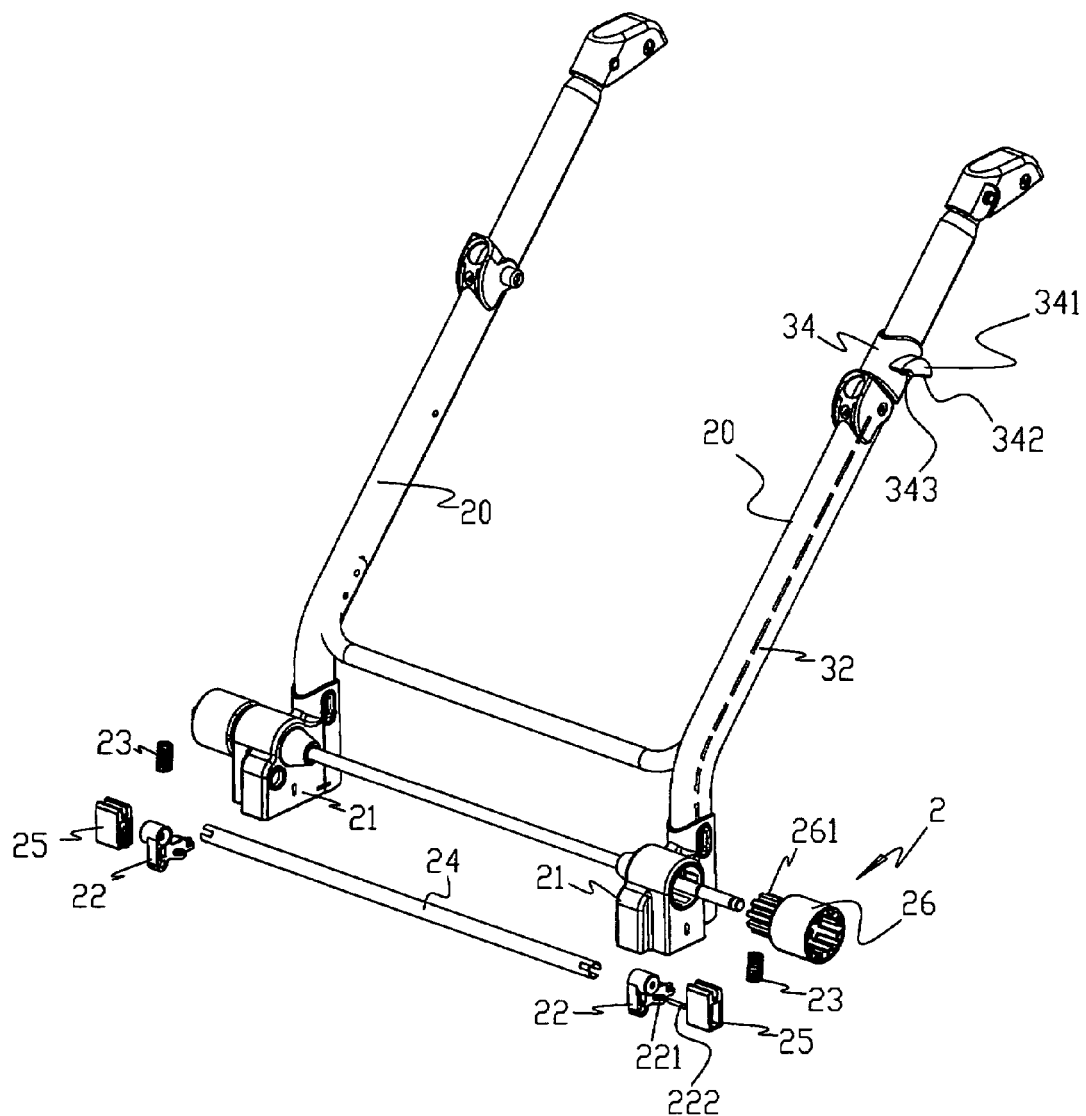
FIG. 5 is an exploded perspective view of a brake mechanism associated pulling slider of the connecting assembly via a lower flexible connector.

Referring back to FIG. 5, the brake mechanism (2) has a wheel base (21), a driving element (22), a resilient element (23) and a braking block (25). The wheel base (21) is connected with the leg frame (20) of the stroller, movably receives the braking block (25) and the resilient element (23), and is pivotally connected a wheel hub (26) and the driving element (22). The wheel hub (26) preferably has a toothed portion (261) for engaging with the braking block (25).

The driving element (22) has a part connected with the lower end of the lower flexible connector (32), and can rotate about a pivot point (not shown) in the wheel base (21). The resilient element (23) is biased on the braking block (25) so as to leave the toothed portion (261) of the wheel hub (26), until the driving element (22) is pulled by the lower flexible connector (32).

Figure 6:
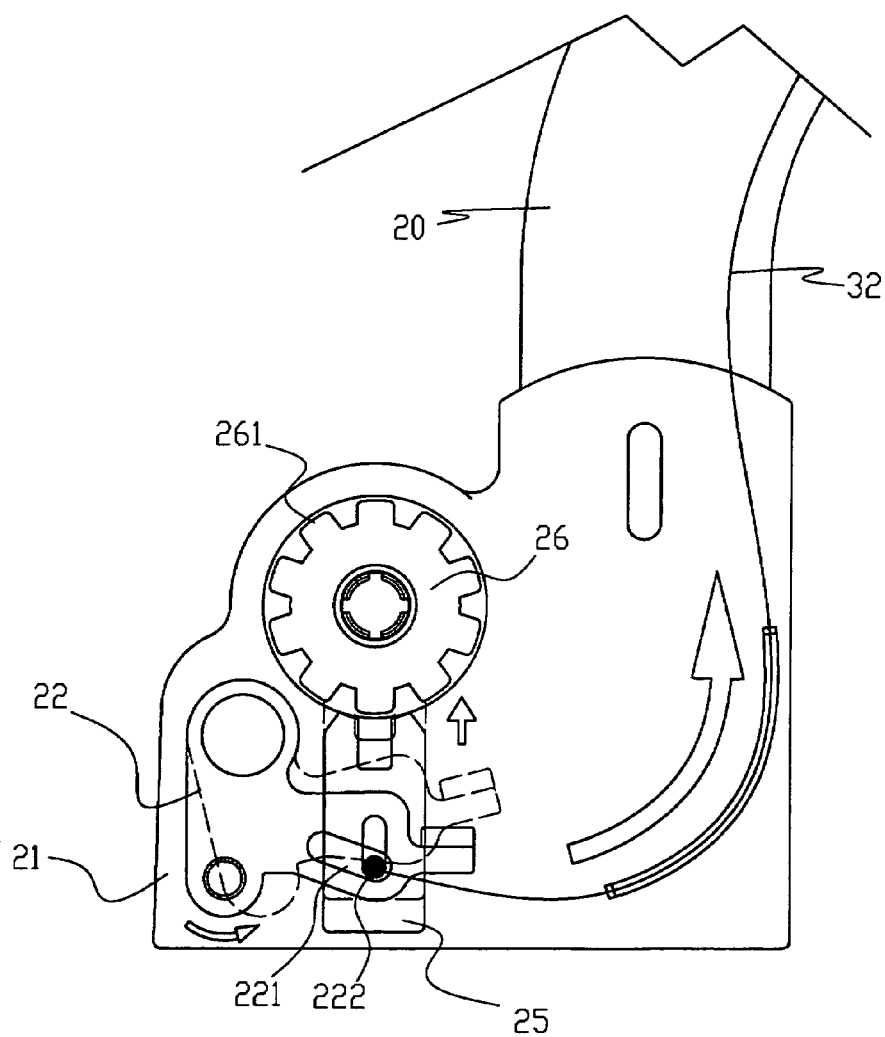
FIG. 6 is a side view schematically showing the of the brake mechanism FIG. 5.

Referring to FIG. 6, as shown by the arrows, when the driving element (22) is pulled by the lower flexible connector (32), the driving element (22) is rotated so as to drive the braking block (25) to move against the biasing of the resilient element (23), so as to force the braking block (25) to engage with the toothed portion (261) of the wheel hub (26) and brake the wheel (27) mounted on the wheel hub (26). The driving element (22) may have a skew slot (221), and the lower flexible connector (32) is connected with the driving element (22) by a pin (222) movably inserted in the skew slot (221).

As will be appreciated, the brake mechanism (2) may further include a connecting bar (24) interconnecting the driving elements (22), which is disposed on the left and right side respectively, so as to simultaneously brake wheels (27) of the left and right side of the stroller.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake mechanism for a baby stroller, the baby stroller having at least a wheel connected to a toothed portion and a pair of push arms capable of being repositioned by rotation to allow the stroller to be pushed forward or rearward, the brake mechanism comprising:
    a braking block for operatively stopping the baby stroller by engaging with the toothed portion;
    a connecting assembly for operatively actuating the braking block; and
    an actuator, operatively secured to the push arm and associated with the connecting assembly for indirectly driving the brake mechanism, the actuator having a base, a control member, a release element, and an upper flexible connector, the upper flexible connector having an upper end connected with the control member via a pin and a lower end connected to the connecting assembly, the base being connected to one of the push arms, the control member being pivotally connected to the base, and the release element being lockable and releasably engaged with the control member when in a braking position;
    wherein the release element has a protruding positioning portion for locking the control member in the braking position.

2. The brake mechanism for a baby stroller as claimed in claim 1, wherein the actuator further has a pin for connecting one end of the upper flexible connector and the control member, so as to pull the upper flexible connector by rotation of the control member about the base.

3. The brake mechanism for a baby stroller as claimed in claim 1, wherein the connecting assembly has a driving slider, a pulling slider and a lower flexible connector, the driving slider being movably secured to one of the push arms, the pulling slider being reciprocally associated with the braking block of the brake mechanism via the lower flexible connector, and the driving slider being reciprocally associated with the control member of the actuator via the upper flexible connector and abutting on the pulling slider for indirectly associating with the brake mechanism.

4. The brake mechanism for a baby stroller as claimed in claim 1, further comprising a wheel base, a driving element and a resilient element, the wheel base being connected with the leg frame of the stroller and movably receiving the braking block and the resilient element, and being connected with a wheel hub and the driving element, the wheel hub having the toothed portion for engaging with the braking block.

5. The brake mechanism for a baby stroller as claimed in claim 4, wherein the driving element has a part connected with one end of the lower flexible connector, and rotates about the wheel base for driving the braking block into a braking position.

6. The brake mechanism for a baby stroller as claimed in claim 4, wherein the resilient element is biased on the braking block so as to leave the toothed portion of the wheel hub, until the driving element is pulled by the lower flexible connector.

7. The brake mechanism for a baby stroller as claimed in claim 4, wherein the brake mechanism further includes a connecting bar for interconnecting the driving elements at both sides of the stroller, so as to simultaneously brake the wheels on both sides of the stroller.

8. A brake mechanism for a baby stroller, the baby stroller having a plurality of wheels and a pair of push arms capable of being moved forward or rearward, the brake mechanism comprising:

a braking block for operatively stopping the baby stroller;
   a connecting assembly operatively associated with the braking block; and
   an actuator, operatively secured to the push arm and associated with the connecting assembly for indirectly driving the brake mechanism, the actuator having a base, a control member, a release element, and an upper flexible connector, the base being connected to one of the push arms, the control member being pivotally connected to the base and associated with the connecting assembly via the upper flexible connector, and the release element being lockable and releasably engaged with the control member when in a braking position;
   wherein the release element has a protruding positioning portion for locking the control member in the braking position;
   wherein the actuator further has a pin for connecting one end of the upper flexible connector and the control member, so as to pull the upper flexible connector by rotation of the control member about the base; and
   wherein the push arm and the base both have a slot for guiding movement of the pin.

9. A brake mechanism for a baby stroller, the baby stroller having a plurality of wheels and a pair of push arms capable of being moved forward or rearward, the brake mechanism comprising:

a braking block for operatively stopping the baby stroller;
   a connecting assembly operatively associated with the braking block; and
   an actuator, operatively secured to the push arm and associated with the connecting assembly for indirectly driving the brake mechanism, the actuator having a base, a control member, a release element, and an upper flexible connector, the base being connected to one of the push arms, the control member being pivotally connected to the base and associated with the connecting assembly via the upper flexible connector, and the release element being lockable and releasably engaged with the control member when in a braking position;
   wherein the release element has a protruding positioning portion for locking the control member in the braking position;
   wherein the connecting assembly has a driving slider, a pulling slider and a lower flexible connector, the driving slider being movably secured to the push arm, the pulling slider being reciprocally associated with the braking block of the brake mechanism via the lower flexible connector, and the driving slider being reciprocally associated with the control member of the actuator via the upper flexible connector and abutting on the pulling slider for indirectly associating with the brake mechanism; and
   wherein the driving slider has a first protruded block for abutting a first abutting face of the pulling slider, and has a second protruded block for abutting a second abutting face of the pulling slider, so as to drive the pulling slider.

\* \* \* \* \*